United States Patent [19]

Tobber

[11] 4,201,049

[45] May 6, 1980

[54] TURBINE POWER PLANT

[76] Inventor: Arno W. Tobber, 1010 Sixth Ave., Dorval, Quebec, Canada

[21] Appl. No.: 964,810

[22] Filed: Nov. 29, 1978

[51] Int. Cl.² ............................................. F16D 33/00
[52] U.S. Cl. ........................................ 60/325; 60/597; 60/624; 417/92
[58] Field of Search ................. 60/325, 327, 597, 624; 417/65, 73, 92

[56] References Cited

U.S. PATENT DOCUMENTS

| | | | |
|---|---|---|---|
| 448,621 | 3/1891 | Altham | 415/117 |
| 1,050,410 | 1/1913 | Wainwright | 60/698 |
| 1,055,880 | 3/1913 | Coster | 60/624 |
| 4,100,742 | 7/1978 | Harp | 60/624 X |

*Primary Examiner*—Edgar W. Geoghegan

[57] ABSTRACT

A turbine power plant of particularly inexpensive construction and using static expansion of the combustion gas to accelerate slugs of liquid used as the motive power for a Pelton wheel. The turbine power plant comprises a fuel combustion unit producing combustion gas which serves to impart speed to slugs of an auxiliary liquid, like water, in output pipes; this auxiliary liquid acts on a Pelton wheel to produce rotary drive. A part of the auxiliary liquid is reconverted as slugs to compress the air supplied to the fuel combustion unit. The turbine power plant also includes a second Pelton wheel driving a common shaft for an air fan, and a pair of rotating nozzles arranged to produce the said slugs of auxiliary liquid. The second Pelton wheel is driven by part of the auxiliary liquid.

10 Claims, 3 Drawing Figures

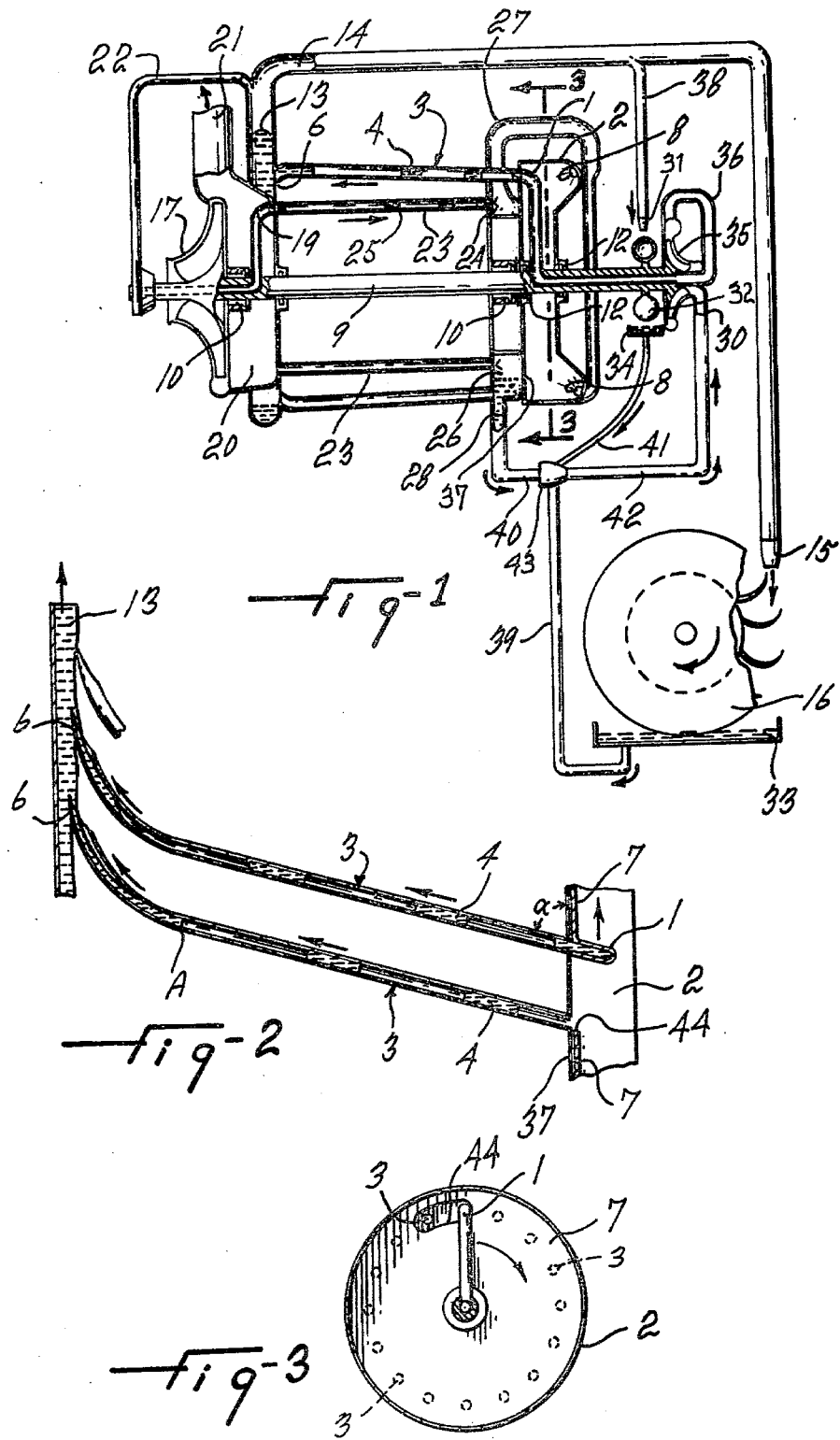

TURBINE POWER PLANT

This invention relates to turbines and more specifically to a turbine power plant adaptable for use as engine for an automobile.

The principle of a common gas turbine determines that its speed in high and the output efficiency is low. Materials for the rotor and the blades are expensive and so is their manufacture. If such a turbine is to be used as a prime mover in an automobile, a transmission would also be required, and a transmission wastes energy and is expensive.

The present invention proposes a turbine power plant in which the turbine is driven by an auxiliary liquid of relatively high specific gravity accelerated as slugs by the efficient static expansion of combustion gas. In addition this invention uses a simple and effective Pelton wheel as the impeller device. As is known, a Pelton wheel has the double advantage of high starting torque and low speed if the available energy is applied to it in a liquid of high specific gravity. Thus, a Pelton wheel driven by such a liquid eliminates the need for a transmission in a car. Also no precision reduction gearing would be required, further reducing weight, cost, as well as noise.

Therefore, it is an object of the present invention to provide a turbine power plant using low pollution external combustion in combination with the efficiency of static expansion of the combustion gas to accelerate a liquid which then drives a turbine.

It is another object of the present invention to provide a turbine power plant of relatively higher efficiency than other gas turbines and using a liquid driven Pelton wheel.

It is a still further object of the present invention to provide a turbine power plant whose mechanical design does not have to cope with high revolutions and highly stressed parts subjected to high temperatures, and of shapes which are expensive to manufacture.

These ojbects are realized in a preferred embodiment of the invention having a fuel combustion unit, a system of concentric outlet pipes wherein the combustion gas expands, and a nozzle pipe rotating in the fuel combustion unit and shooting slugs of auxiliary liquid alternately with the pressurized gas into the outlet pipes. The gas expanding in the pipes accelerates the slugs. The pipes lead into a collecting manifold where the expanded gas is discharged to the atmosphere and the accelerated slugs form a continuous liquid stream which is used to drive a turbine, preferably a Pelton wheel. Combustion air is pressurized by an air fan in a first stage and by using in a second stage a similar system of concentric pipes and rotating nozzles wherein part of the high velocity liquid is alternately injected as slugs with partially compressed air. The kinetic energy of the slugs compresses the air which is directed to the fuel combustion unit. The auxiliary liquid is returned into the circuit by a series of collecting troughs or sumps leading to a pump impeller mounted on the same shaft as the rotating nozzle pipes and the air fan. A second small Pelton wheel driven by part of the auxiliary liquid is also mounted on the same shaft to rotate the shaft.

The above will be more clearly understood by referral to the following preferred embodiment of the invention illustrated by way of the accompanying drawings in which:

FIG. 1 is a sectional side view of the turbine power plant;

FIG. 2 is an enlarged sectional view of the outlet pipes leading from the fuel combustion unit into the collecting manifold; and FIG. 3 is a cross-sectional view taken along line 3—3 of FIG. 1.

Like numerals refer to like elements throughout the drawings.

In FIG. 1, the main shaft 9 is shown rotating in the bearings 10 and carrying at one end the nozzle pipe 1 which is for instance, rotated in the fuel combustion chamber 2 by means of a Pelton wheel 32 to be described hereinafter. Seals 12 seal the fuel combustion chamber 2 to the outside. Facing nozzle pipe 1 is a circular wall 37 of chamber 2, provided with the openings for pipes 3 arranged in equally radial and spaced-apart relationship concentric with shaft 9. The pipes 3 lead tangentially into a collecting manifold or trough 13 open to the atmosphere. The pipes 3 are each cut open at 6 as shown in FIG. 2 so that they are open to the atmosphere at that point.

Compressed air and fuel are supplied to burners 8 and combusted there in a usual way, filling the fuel combustion chamber 2 with high pressure combustion gas. Pressurized liquid with appropriate properties is sent through shaft 9 which is partially hollow. As nozzle pipe 1 rotates around the face of the circular wall 37, the liquid is injected into the pipes 3 in the form of slugs 4. After the nozzle has cleared the pipe openings the latter are now open to the combustion chamber the high pressure combustion gas enters the pipe and accelerates the slug in front of it. The gas column will be followed by another slug and so on until the whole length of each of the pipes 3 will be filled. The pipes 3 are of a sufficient length for the gas to have expanded almost to atmospheric pressure when the gas and slugs exit at 6 (shown in FIG. 2). This means that the gas has transmitted its available energy to the slugs in the form of velocity imparted to the slugs.

The curve at the end of pipes 3 merges the slugs with the liquid stream in collecting manifold 13 without losses in the following manner: beginning at "A" a slug is subjected to a centrifugal force and is therefore caused to elongate. Since the elongated liquid slugs of the several pipes 3 have the same velocity, they merge completely and without any loss to form a continuous mainstream in channel 13 and the gas is discharged into the atmosphere through tube ends 6 and through the open manifold 13. Starting at "A", due to the curved end portion of tubes 3, the centrifugal force separates the liquid slug from the gas, allowing the latter to escape. The main portion of the fluid collected in manifold 13 is used to do effective work by being directed through the pipe 14 to the nozzle 15 shown in FIG. 1 which directs it to a Pelton wheel 16 which constitutes the drive, for instance, of an automobile.

In a turbine, a process which is next in importance to the one described above is the compression of the combustion air. In the preferred embodiment of the invention, a two-stage compression is used. The first stage is carried out by a conventional centrifugal fan having an impeller 17 mounted on the shaft 9. Impeller 17 delivers cooling air through the pipe 21 to wherever it is required and combustion air into an air chamber 20 for further compression.

Using the efficient static compression the air from chamber 20 is further compressed in a second stage in the following manner: part of the liquid from the collecting channel 13 is sent through the pipe 22 to a nozzle 19 which is attached to shaft 9 and rotates in the air chamber 20 just as nozzle pipe 1 rotates in the fuel combustion chamber 2. Leading out of air chamber 20 and equally and radially spaced-apart are openings of a plurality of pipes 23 concentric with the axis of rotation of nozzle pipe 19. Pipes 23 lead at their opposite end into a compression chamber 26 through check valves 24. The precompressed air from chamber 20 which is in communication with the pipes 23 enters these pipes 23, and as the high velocity liquid slugs 25 are injected into pipes 23, the air is further compressed and finally pushed through check valves 24 into the circular compressed air chamber 26 along with the liquid slugs. From there the compressed air is led through a pipe 27 to the burners 8 while the decelerated liquid collects in the sump 28. It is clear that the process described here is the reverse of the process described in pipes 3: i.e. in pipes 23, the fluid slugs are themselves the propelling force, acting as pistons to compress the air.

Shaft 9 is driven by a small Pelton wheel 32 attached to shaft 9. Part of the working liquid from pipe 14 is diverted into pipe 38 and nozzle 31 to provide Pelton wheel 32 with its motive energy. It is to be noted that there are many different ways of driving shaft 9.

It is to be noted further that there are also several ways of returning the spent liquid back into the circuit. In the preferred embodiment, however, this is accomplished by having sumps 28, 33 and 34 of chamber 26 and Pelton wheels 16 and 32 respectively connected through pipes 40, 39, 42 and 41 to the intake 30 of a centrifugal pump having an impeller 35 mounted on shaft 9. By means of an injector 43 the fluid emerging under high pressure from sump 26 could be used to elevate the fluid from other sumps into pipe 30. From this pump, the fluid is then supplied under pressure to the nozzle pipe 1 through the pipe 36.

As the system has been described hereabove, the full gas pressure acts on the last slug in pipes 3 until the time a new one is injected. It could be advantageous to let only a limited amount of gas enter the pipe and then to shut off the supply. In this case, the gas will have expanded somewhat by the time the next slug is injected. This can be achieved by having a closure plate 7 as shown in FIGS. 2 and 3 secured to the nozzle pipe 1 which closes off the entrance of gas to the pipes 3. An opening 44 just behind the nozzle would admit gas into the pipes 3, the amount of which will depend on the circumferential length of this opening.

It has been found that, in order to avoid even the slightest losses, the liquid slugs should be as compact as possible, i.e. the ends of the slugs should be square to their longitudinal extension. To achieve this, the angle α of FIG. 2 is derived from the rotational speed of the nozzle pipe 1 and the outflow speed of the liquid.

If the turbine power plant described herein is to be used as a power plant in an automobile, it can be of particular advantage that the power wheel is independent of the rest of the equipment. Another advantage is that the starting torque and the torque at slow speeds can be multiplied by very simple well-known means: after the liquid has passed through the buckets of Pelton wheel 16, it only has to be redirected back into the wheel one or more times.

Also, it is to be noted that the transmission of the energy of the combusted gas to the liquid is carried out by the most efficient static expansion and the also efficient Pelton wheel is used to transform the dynamic energy of the liquid into the mechanical rotating energy of the shaft. The output speed is low because the liquid has become the working medium and the higher the specific gravity of the selected liquid, the lower the output speed.

What I claim is:

1. A turbine power plant comprising a fuel combustion unit operatively producing combustion gas under pressure, combustion gas outlet means including at least one tubular gas outlet connected in communication with said combustion unit, an auxiliary liquid supply communicating with said tubular gas outlet and producing spaced-apart slugs of auxiliary liquid in the outward flow of combustion gas in said tubular gas outlet, said slugs accelerating while in said tubular gas outlet by the expansion of the combustion gas therein, a collector manifold connected to said tubular gas outlet and operatively receiving the accelerated slugs of auxiliary liquid, and an impeller device connected to said collector manifold and operatively driven by said auxiliary liquid.

2. A turbine power plant as defined in claim 1, wherein said impeller device is a Pelton wheel.

3. A turbine power plant as defined in claim 1, wherein said fuel combustion unit includes a combustion chamber and said combustion gas outlet means includes a plurality of outlet ports from said combustion chamber, said ports each communicating with a tubular gas outlet, and said auxiliary liquid supply includes a nozzle member sequentially supplying slugs of auxiliary liquid into said plurality of outlet ports in the flow of combustion gas outwardly through said tubular gas outlets.

4. A turbine power plant as defined in claim 3, wherein a shaft rotatably extends through said fuel combustion chamber, the latter includes one radial wall relative to said shaft, said outlet ports are serially arranged circumferentially in said one radial wall and concentric with said shaft, and said nozzle member includes a pipe bodily rotatable with said shaft and having an outer end forming a nozzle operatively registering sequentially with said outlet ports upon rotation of said shaft.

5. A turbine power plant as defined in claim 4, wherein said plurality of tubular gas outlets communicate with said collector manifold at their outlet end.

6. A turbine power plant as defined in claim 4, further comprising another impeller device connected to said shaft externally of said fuel combustion unit and to said collector manifold and bodily rotating said shaft, said pipe, and said nozzle in response to a flow of auxiliary liquid thereto from said collector manifold.

7. A turbine power plant as defined in cliam 6, further comprising a pump connected on said shaft, driven by the latter, having an output connected to said pipe and said nozzle, and operatively pumping auxiliary liquid to said nozzle upon rotation of said shaft.

8. A turbine power plant as defined in claim 1, wherein said fuel combustion unit includes a compressed air inlet, and further comprising an air compressor having at least one tubular air outlet in communication with said compressed air inlet, and means to feed part of said auxiliary liquid from said collector manifold as spaced-apart slugs into said tubular air outlet, said slugs compressing said air in said tubular air outlet while decelerating in the latter.

9. A turbine power plant as defined in claim 8, wherein said air compressor includes a compressed air manifold having a plurality of air outlet ports, each communicating with one tubular air outlet, means to supply compressed air to said last named manifold and said feeding means includes a nozzle member sequentially supplying slugs of said auxiliary liquid into said plurality of air outlet ports.

10. A turbine power plant as defined in claim 7, wherein said another impeller device includes a Pelton wheel actuated by the flow of auxiliary liquid acting thereon, said plurality of tubular gas outlets communicating with said collector manifold at their outlet end, said fuel combustion unit includes a compressed air inlet manifold, a compressed air supply pump connected to said shaft, driven by the latter, a chamber for receiving air compressed by said pump and including an radial wall relative to said shaft, air outlet ports serially arranged circumferentially in said radial wall of said chamber, and relative to said shaft, a plurality of tubular air outlets operatively communicate at one end with said air outlet ports respectively and at the other end with said air inlet manifold, and a nozzle pipe is bodily rotatable with said shaft, is connected to said collector manifold and has an outer end forming a nozzle operatively registering sequentially with said air outlet ports upon rotation of said shaft and supplying slugs of auxiliary liquid into said air outlet ports thereby operatively compressing air flowing in said tubular air outlets toward said air inlet manifold.

* * * * *